United States Patent [19]

Moczygemba

[11] 4,403,074

[45] Sep. 6, 1983

[54] CLEAR HAZE-FREE IMPACT-RESISTANT RESINOUS POLYMERS

[75] Inventor: George A. Moczygemba, Bartlesville, Okla.

[73] Assignee: Phillips Petroleum Company, Bartlesville, Okla.

[21] Appl. No.: 339,221

[22] Filed: Jan. 13, 1982

[51] Int. Cl.$^3$ .............................. C08F 8/06; C08F 8/10
[52] U.S. Cl. ..................................... 525/386; 525/314
[58] Field of Search ................................ 525/314, 386

[56] References Cited

U.S. PATENT DOCUMENTS

| | | | |
|---|---|---|---|
| 2,893,982 | 7/1959 | Campbell | 528/486 |
| 3,281,383 | 10/1966 | Zelinski et al. | 525/122 |
| 3,383,377 | 5/1968 | Uraneck et al. | 525/350 |
| 3,384,629 | 5/1968 | Stobel | 526/84 |
| 3,551,392 | 12/1970 | Snyder et al. | 525/386 |
| 3,598,887 | 8/1971 | Darcy et al. | 525/271 |
| 3,639,517 | 2/1972 | Kitchen et al. | 525/92 |
| 3,668,279 | 6/1972 | Loveless et al. | 525/386 |
| 3,801,520 | 4/1974 | Hogan et al. | 525/383 |
| 4,049,753 | 9/1977 | Moczygemba | 525/314 |
| 4,091,053 | 5/1978 | Kitchen | 525/98 |
| 4,152,370 | 5/1979 | Moczygemba | 525/314 |
| 4,180,530 | 12/1979 | Bi et al. | 525/98 |
| 4,186,047 | 1/1980 | Salmon | 528/501 |
| 4,221,884 | 9/1980 | Bi et al. | 525/314 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,304,886 | 12/1981 | Bean et al. | 525/314 |

*Primary Examiner*—Ronald W. Griffin

[57] ABSTRACT

Clear, haze-free, colorless, impact-resistant resinous copolymers are produced by terminating the coupled polymer-lithium with water and linear saturated aliphatic dicarboxylic acids selected from $C_2$, $C_3$, and $C_5$ to $C_{16}$ acids.

16 Claims, No Drawings

CLEAR HAZE-FREE IMPACT-RESISTANT RESINOUS POLYMERS

The invention relates to clear, haze-free, impact-resistant resinous polymers. In another aspect, the invention relates to methods of producing clear, haze-free, colorless, impact-resistant polymers.

Resinous impact-resistant copolymers are discussed in such as U.S. Pat. Nos. 3,639,517 and 4,091,053 describing particular methods of initiator addition as well as coupling procedures. Other patents describing resinous impact-resistant copolymers are such as U.S. Pat. Nos. 4,180,530; 4,221,884; 4,248,980; 4,248,981; 4,248,982; 4,248,983.

BACKGROUND OF THE INVENTION

Various procedures have been employed to recover coupled alkali metal solution-polymerized resinous copolymers, to obtain copolymers which are clear, colorless, and haze-free for use in bottles and the like. One particularly useful method of recovering the coupled polymers from hydrocarbon solution has employed treatment with carbon dioxide and water. However, a disadvantage resulting therefrom has been the necessity to fractionate the solvent thereafter to remove the water and carbon dioxide, so as to permit recycle of the solvent to polymerization in a clean condition free of initiator terminating components.

Improvements in recovery procedures and methods are needed, particularly to find methods to eliminate the difficult-to-handle carbon dioxide which mixes poorly with polymer and cement. Of course, it is essential to obtain the resinous polymers as haze-free, clear, colorless, and impact-resistant.

High clarity is exceedingly desirable, yet while maintaining impact-resistant characteristics of the resinous polymer. To produce a colorless, clear, haze-free product, yet maintain the other desirable physical properties, has indeed been a problem.

BRIEF SUMMARY OF THE INVENTION

I have discovered that by using certain saturated linear aliphatic (alkane) dicarboxylic acids (dibasic acids) in terminating prior to final solvent removal, the living resinous copolymer-alkali metal cement, the solution of polymer-alkali metal in hydrocarbon solvent provides an impact-resistant, clear, and haze-free product. The suitable dicarboxylic acids are the $C_2$, $C_3$, and $C_5$ to $C_{16}$ linear saturated dicarboxylic acids; preferably effective are oxalic, malonic, glutaric, adipic, suberic, sebacic, undecanedioic, and dodecanedioic acids, to produce haze-free, clear, colorless, impact-resistant resinous copolymer products.

DETAILED DESCRIPTION OF THE INVENTION

In general, my invention is applicable to processes for the recovery from polymer cement of resinous copolymers of hydrocarbon conjugated dienes with hydrocarbon monovinylarenes. Such copolymers can be prepared by the polymerization in hydrocarbon solvent using solution polymerization techniques and alkali metal-based initiation of at least one monomer of each type in admixture or sequentially; or combination of such procedures such as polymerization of the monovinylarene first followed by a conjugated diene second, or of the monovinylarene first followed by a mixture of additional monovinylarene plus conjugated diene, utilizing a single initial addition of hydrocarbyl alkali metal initiator, or dual initiator addition techniques whereby a portion of the initiator is added with a first charge of monovinylarene for example, followed by a second charge along with additional monovinylarene, and even a third charge with or without additional initiator; or by the addition of a portion of the initiator with an initial charge of monovinylarene, and addition of further initiator at the time the conjugated diene or mixture of monovinylarene/conjugated diene is further added.

Such polymerizations are conducted in solution employing a diluent, and employing any of the alkali metal-based initiators as practiced in the art. Subsequent to the polymerization of all of the monomers, and prior to the addition of any other agent which would terminate the resulting polymer-alkali metal, a coupling agent or agents is added to produce coupled copolymers. The result is a mixture of coupled and uncoupled species depending on the functionality and amount of each of the respective coupling agents employed. The product may represent substantially a linear admixture of coupled species, or mixture of linear and radial, or substantially radial.

Subsequently, in accordance with my invention, final termination and recovery is conducted by treating the polymer-cement, preferably after flashing off a proportion of the hydrocarbon solvent, with water and a linear saturated alkane dicarboxylic acids (aliphatic dibasic acids) selected from $C_2$, $C_3$, and $C_5$–$C_{16}$ diacids, most preferably selected from the group consisting of oxalic, malonic, glutaric, adipic, suberic, sebacic, undecanedioic, and dodecanedioic acids, or mixtures, to produce impact resistant resinous plastics which are basically clear, colorless, and haze-free.

POLYMERIZATION PROCESS

My invention is applicable to resinous thermoplastic block polymers of either linear or radially branched types, and in which the arms of each branch are either composed as substantially pure homopolymeric blocks of polymonovinylarene represented by A and polyconjugated diene represented by B, such that the polymer would be represented by A-B-x-B-A in the case of linear polymer and x representing the coupling agents residue, or in which the block of polyconjugated diene can be a random block which can be represented by A/B or B/A indicating either purely random or a tapered random block. Most preferably, these products are formed by means of a multiple addition of initiator.

Preferably, the process of polymerization involves a polymerization process in which non-elastomeric (resinous) blocks of polymer are first formed. The resinous portion of the block polymer is formed by charging a substantial portion of the total amount of monovinyl-substituted aromatic hydrocarbon monomer employed to a polymerization vessel and contacting said monomer with a relatively small amount of organolithium initiator and maintaining polymerization conditions for a period of time sufficient to convert essentially all of the monomer and the initiator to relatively long non-elastomeric chains of living polymer having active terminal lithium atoms.

The remainder of the total monovinyl-substituted aromatic hydrocarbon monomer employed is then charged in one or more increments, to said polymerization vessel containing the polymerization reaction product of the first charge such that each incremental charge of monomer is accomplished by a corresponding incremental charge of initiator so that a relatively large amount of initiator is employed per amount of monomer. The polymerization conditions are maintained and after each incremental charge of monomer and initiator a sufficient time is allowed to convert essentially all of the newly added monomer and initiator to non-elastomeric chains of living polymer.

After the non-elastomeric polymer fraction has been prepared, the chains of non-elastomeric living polymer are contacted with conjugated diene monomer which is charged to the polymerization vessel and the reaction mixture is allowed to polymerize again to essential completion to form chains of living copolymer containing both elastomeric and non-elastomeric blocks.

In another technique, the amount of initiator added with each portion of monovinylarene is substantially equal. Such techniques are taught in such as U.S. Pat. No. 3,639,517, the disclosure of which is hereby incorporated in total.

In another mode, in the first stage, 80 to 95 percent by weight of the total amount of monovinyl aromatic compound is polymerized in an inert solvent using a hydrocarbyllithium initiator to form linear segments (A-Li), of the monovinyl aromatic compound having lithium ions at the ends. The polymerization is allowed to proceed to essential completion.

In the second stage, an additional amount of the hydrocarbyllithium initiator, equal to or greater than the amount added in the first stage, is added to the mixture from stage one, the remainder of the monovinyl aromatic compound is added, and 60 to 80 percent by weight of the total amount of the conjugated diene is continuously added at a rate, determined by the amounts of total monomer and the relative copolymerization rates of the monovinyl aromatic compound and the conjugated diene, such that an essentially random copolymer segment, B/A'-Li, is formed. Simultaneously with the formation of the B/A'-Li segments, the A-Li segments from stage two will form A-B/A'-Li segments.

The second stage may also be carried out by other known means of preparing styrene/butadiene type random copolymers. For example, after the additional amount of initiator is added to the mixture from stage one, a mixture of the remaining monovinyl aromatic compound and 60 to 80 percent by weight of the total amount of conjugated diene can be added continuously to the reaction mixture at a rate such that an essentially random copolymer block is formed. Methods are also known for producing random copolymer blocks using as randomizer a polar compound, such as the tertiary amines, thioethers, or cyclic ethers.

In the third stage, the remaining 20-40 percent by weight of conjugated diene is added to the segments from stage two and allowed to polymerize to essentially complete conversion to form a polydiene block segment on each of the previously formed segments. Thus, the mixture now contains A-B/A'-B'-Li and B/A'-B'-Li segments. Alternatively, in the second stage, the additional addition of the lithium initiator can be omitted, in which case the product is monomodal rather than polymodal. Variations of such techniques can be employed, of course, as will be recognized by one skilled in the art.

In general, my invention is applicable to processes for the recovery of resinous copolymers of conjugated dienes with monovinylarenes prepared by the copolymerization of the monomers in a hydrocarbon diluent employing an alkali metal-based initiator.

The conjugated dienes employed ordinarily are those of 4 to 12 carbon atoms per molecule, with those 4 to 8 carbon atoms preferred for availability. Such monomers include 1,3-butadiene, isoprene, 2,3-dimethyl-1,3-butadiene, piperylene, 3-butyl-1,3-octadiene, 2-phenyl-1,3-butadiene, and the like. The monovinylarenes employed ordinarily contain 8 to 20, more conveniently 8 to 12, carbon atoms per molecule, including such as styrene, α-methylstyrene, 1-vinylnaphthalene, 2-vinylnaphthalene, as well as the alkyl, cycloalkyl, aryl, alkaryl, and aralkyl derivatives thereof in which the total number of carbon atoms in the combined substituents generally is not greater than 12. Examples of substituted monomers include 3-methylstyrene, 4-n-propylstyrene, 4-cyclohexylstyrene, 4-dodecylstyrene, 3-ethyl-4-benzylstyrene, 4-p-tolystyrene, 4-(4-phenyl-n-butyl)styrene, and the like.

The weight ratio of conjugated diene:monovinylarene monomers for resinous copolymers is such that the product is resinous, and usually will be in the range of about 45:55 to 1:99.

The solution process polymerization as is known in the art is carried out in a hydrocarbon diluent at any suitable temperature such as in the range of about $-100°$ to $150°$ C., more usually about $0°$ to $110°$ C., at a pressure sufficient to maintain the reaction mixture substantially as a liquid. Suitable diluents, include, for example, paraffins, cycloparaffins, and aromatic hydrocarbons, of such as 4 to 10 carbon atoms per molecule. Examples include pentane, hexane, cyclopentane, cyclohexane, isooctane, benzene, toluene, and mixtures. As is known, small amounts of polar compounds can be included in the diluent for vinyl control in diene polymers, or to improve effectiveness of some initiators for monovinylarene polymerizations, and the like.

The initiators can be any of the alkali metals or organoalkali metal compounds known for such purposes. Preferably employed are the organoalkali metal compounds which correspond to the formula $RM_x$ in which R is a hydrocarbyl aliphatic, cycloaliphatic, or aromatic radical, x is an integer of 1 to 4 inclusive, and M is an alkali metal, preferably lithium. The amount of alkali metal-based initiator employed depends upon the desired polymer molecular weight, and can range from about 0.1 to 40 gram milliequivalents per 100 grams of monomers. The polymerization is conducted in the substantial absence of air or moisture, preferably in an inert atmosphere. The resulting polymers contain a very high percentage of molecules in which an alkali metal atom is positioned at the end or ends of the polymer chains, although any traces of impurities present, such as water or alcohol, tend to reduce the amount of alkali metal-terminated polymer formed. Thereafter, a coupling step is performed.

COUPLING REACTION

In my use of the term "coupling" as herein employed, the term is a broad generic term meaning the bringing together and joining by means of one or more central coupling atoms or coupling moieties, two or more of the living lithium-terminated polymer chains.

A wide variety of compounds suitable for such purposes can be employed. Among the suitable coupling agents are the multivinylaromatic compounds, multiepoxides, multiisocyanates, multiimines, multialdehydes, multiketones, multihalides, particularly silicon halides and halosilanes, multianhydrides, multiesters which are the esters of monoalcohols with polycarboxylic acids, the diesters which are esters of monohydric alcohols with dicarboxylic acids, lactones, and the like, including combination type compounds containing two or more groups, and mixtures.

Examples of suitable multivinylaromatic compounds include divinylbenzene, 1,2,4-trivinylbenzene, 1,3-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalenetricarboxyaldehyde, 1,7,9-anthracenetricarboxaldehyde, 1,1,5-pentanetricarboxyaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the multiesters include diethyladipate, triethylcitrate, 1,3,5-tricarbethoxybenzene, and the like.

Among the multihalides are the silicon tetrahalides such as silicon tetrachloride, silicon tetrabromide, and silicon tetraiodide; the trihalosilanes such as trifluorosilane, trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

In addition to the silicon multihalides as described hereinabove, other metal multihalides, particularly those of tin, lead, or germanium, also can be readily employed as coupling and branching agents. Furthermore, silicon or other metal multialkoxides, such as silicon tetraethoxide, are also suitable coupling agents.

Difunctional counterparts of these agents also can be employed, whereby a linear polymer rather than a branched polymer results.

Any desired effective amount of the coupling agent can be employed. While the amount is not believed to be particularly critical, at least a stoichiometric amount relative to the active polymer-alkali metal tends to promote maximum coupling as a generality. However, less can be used, even less than stoichiometric amounts, for lesser degrees of coupling where desired for particular products of broadened molecular weight. Adding small less-than-stoichiometric amount tends to promote the formation of coupled species of various molecular weights, sometimes desired for improved processability of polymers of conjugated dienes.

Typically, the total amount of coupling agent usually will be in the range of about 0.2 to 20 mhm (gram millimoles per 100 grams of total monomers employed in the polymerization), presently preferably about 1 to 5 mhm.

Most preferred at present to obtain clear, haze-free, colorless, impact-resistant resinous copolymers is an epoxidized soybean oil such as Admex 711, a commercially available (Sherex Co.) epoxidized soybean oil (molecular weight: 980–1000; density: 1.03 g/cc).

POLYMER RECOVERY

Following completion of the coupling reaction, the coupled polymer, which may still contain bound lithium atoms depending on the type of coupling agent employed, is treated to remove any remaining lithium from the copolymer and to recover the copolymer.

Preferably, but not necessarily, the polymer cement is flashed to remove by evaporation a portion of the solvent. The polymer cement from polymerization usually will contain about 10 to 40, more usually 20 to 30, weight percent solvent, the balance solids. It can be concentrated by solvent flashing to reduce the solvent content to a concentration of 10 to 50, more usually 30 to 40, weight percent (corresponding to solids contents of 90 to 50, more usually 70 to 60, weight percent).

The polymer cement from polymerization, optionally concentrated by flashing, then is treated in accordance with my process, with at least one of aliphatic linear alpha omega dibasic acid selected from the group consisting of at least one $C_2$, $C_3$, and $C_6$ to $C_{16}$ diacids; preferably from the group consisting of oxalic, malonic (propanedioic), glutaric (pentanedioic), adipic (hexanedioic), suberic (octanedioic), sebacic (decanedioic), undecanedioic acid, and dodecanedioic acids, and mixtures. The presently preferred dicarboxylic acid is adipic acid because of its low toxicity and low cost.

The amount of the selected dibasic carboxylic acid should be about 0.02 to 2.0 parts per 100 parts of polymer, preferably 0.1 to 0.4 parts per 100 parts of polymer.

The dibasic acid can be added as an aqueous solution or dispersion, or can be admixed with a dry solvent, preferably cyclohexane, when added to the polymer cement, or concentrated polymer cement. Contacting of the polymer cement, or concentrated polymer cement, suitably and effectively can be carried out either in a stirred vessel; or presently very usefully in such as a devolatilizing extruder as described in U.S. Pat. No. 4,186,047, particularly after the polymer cement has been concentrated.

EXAMPLES

Examples following are intended to further illustrate my invention. However, particular materials employed, monomers, relationships, reaction conditions, species, and the like, should be considered exemplary, and not limitative of the reasonable scope of my invention as herein disclosed and claimed.

EXAMPLE I

This Run illustrates the preparation of polymodal, resinous 24/76 weight percent ratio butadiene/styrene block copolymers prepared in accordance with the procedure broadly described in U.S. Pat. Nos. 3,639,517 and 4,091,053. The dicarboxylic acid adipic acid was employed as the treating agent after coupling. Polymerization, coupling, treating with diacid, and termination reactions were conducted in a jacketed, stirred reactor of 3 liter capacity according to the following recipe:

| Recipe I | |
| --- | --- |
| Step I | |
| Cyclohexane, parts by weight | 173 |
| Tetrahydrofuran, parts by weight | 0.024 |
| Styrene, parts by weight | 26.7 |
| n-butyllithium, mhm[a] | 0.60 |
| Reactor Temperature, °C. | 55 → 66[b] |
| Reactor Pressure, psi | 30 → 65[c] |
| Polymerization time, minutes | 20 |
| Step II | |
| Cyclohexane, parts by weight | 10.8 |
| Styrene, parts by weight | 26.4 |
| Reactor Temperature, °C. | 59 → 72[b] |
| Reactor Pressure, psi | 30 → 65[c] |
| Polymerization Time, minutes | 32 |
| Step III | |
| Cyclohexane, parts by weight | 21.6 |
| n-butyllithium | 2.01 |
| Styrene, parts by weight | 22.9 |
| Reactor Temperature | 58 → 68[b] |
| Reactor Pressure, psi | 30 → 60[c] |
| Polymerization Time, minutes | 24 |
| Step IV | |
| Cyclohexane, parts by weight | 21.6 |
| Butadiene, parts by weight | 24.0 |
| Reactor Temperature, °C. | 69 → 100[b] |
| Reactor Pressure, psi | 30 → 70[c] |
| Polymerization Time, minutes | 26 |
| Step V | |
| Cyclohexane, parts by weight | 10.8 |
| Admex 711 coupling agent, parts by weight | 1.03 |
| Reactor Temperature, °C. | 100 |
| Reactor Pressure, psi | 30 |
| Coupling Time, minutes | 10 |
| Step VI | |
| Cyclohexane, parts by weight | 21.6 |
| Adipic Acid, parts by weight | 0.20 |
| Termination Temperatures, °C. | 100 |
| Reactor Pressure, psi | 30 |
| Termination Time, minutes | 10 |
| Step VII | |
| Cyclohexane, parts by weight | 10.8 |
| Tris(nonyltriphenyl)phosphite phm | 1.0 |
| 2,6-di-t-butyl-p-cresol, phm[a] | 0.5 |
| Temperature, °C. | 100 |
| Step VIII | |
| Solvent Flashing. | |

[a]gram-millimoles per 100 grams of total monomers.
[b]Polymerization started at lower temperature and peaked at upper temperature.
[c]Polymerization started at lower pressure and peaked at upper pressure.

Physical properties of the inventive polymodal, resinous 24/76 butadiene-styrene copolymer are listed in Table I, compared with a control polymodal, resinous 24/76 butadiene-styrene copolymer prepared by the same recipe as shown above except treated in Step VI with carbon dioxide (50 psi) and water (0.48 parts per 100 parts of total monomer).

TABLE I

| Terminating Agent: | Invention Adipic Acid | Control Carbon Dioxide plus water |
| --- | --- | --- |
| Flexural Modulus[a], MPa | 1611 | 1599 |
| Tensile Strength (Break)[b], MPa | 33.4 | 34.1 |
| Elongation[b], % | 183 | 200 |
| Hardness, Shore D[c] | 68 | 68 |
| Izod Impact, Notched[d], J/m | 23.3 | 21.7 |
| Vicat Temperature[e], °C. | 99 | 86 |
| Haze[f], % | 2.9 | 3.0 |
| Gardner Impact[g], cm Kg/mm | 63 | 55 |
| Color Rating[h] | 1 | 1 |

[a]Determined according to ASTM D790
[b]Determined according to ASTM D638
[c]Determined according to ASTM D2240
[d]Determined according to ASTM D256
[e]Determined according to ASTM 1525
[f]Determined according to ASTM 1003, using a test specimen of 50 mil thickness, employing a Gardner hazemeter.
[g]Determined according to Instruction Manual IG-1120 of Gardner Laboratories, employing a 4 16 weight.
[h]The visual color rating was carried out on a scale of 1 (essentially no color) to 5 (yellow) color of copolymer without any terminating agent.

This Run demonstrates that by my inventive use of adipic acid results in a resinous copolymer of properties as satisfactory as heretofore resulting from termination by $CO_2$ and water.

EXAMPLE II

The Runs in this Example demonstrate that only specific aliphatic dicarboxylic acids employed in accordance with my invention as terminating agents in the preparation of polymodal, resinous diene/monovinylarene copolymers produced essentially colorless, haze-free copolymers.

TABLE II

| Terminating Agent | Amount Added per 100 g Polymer | Visual Color Rating |
| --- | --- | --- |
| None (Control) | — | 5 |
| $H_2O$ + $CO_2$ (Control) | 0.48 ml $H_2O$; 12 psi $CO_2$ | 1 |
| Oxalic Acid | 0.18–0.20 g | 1 |
| Malonic Acid[a] | 0.16 g | 1 |
| Succinic Acid[b] | 0.17–0.18 g | 4.5; 2 |
| Glutaric Acid[c] | 0.16 g | 1 |
| Adipic Acid[d] | 0.19–0.20 g | 1 |
| Suberic Acid[e] | 0.24 g | 1 |
| Sebacic Acid[f] | 0.25 g | 1 |
| Undecanedioic Acid[g] | 0.31 g | 1 |
| Dodecanedioic Acid[h] | 0.28 g | 1 |
| Terephthalic Acid | 0.26 g | 4.5 |
| Phthalic Acid | 0.27 g | 4.5 |

TABLE II-continued

| Terminating Agent | Amount Added per 100 g Polymer | Visual Color Rating |
|---|---|---|
| Acetic Acid (glacial) | 0.17 ml | hazy |
| Oleic Acid | 0.7 g | hazy |
| Lauric Acid | —* | hazy; 2 |
| Octanoic Acid | —* | hazy; 2 |
| Cyclohexylpropionic Acid | —* | hazy; 2 |
| Phosphoric Acid | 0.10 g | 4 |

$^a$HO$_2$C—CH$_2$—CO$_2$H
$^b$HO$_2$C—(CH$_2$)$_2$—CO$_2$H
$^c$HO$_2$C—(CH$_2$)$_3$—CO$_2$H
$^d$HO$_2$C—(CH$_2$)$_4$—CO$_2$H
$^e$HO$_2$C—(CH$_2$)$_6$—CO$_2$H
$^f$HO$_2$C—(CH$_2$)$_8$—CO$_2$H
$^g$HO$_2$C—(CH$_2$)$_9$—CO$_2$H
$^h$HO$_2$C—(CH$_2$)$_{10}$—CO$_2$H
*Exact amounts used not available, though similar to other runs.

Table II shows that only seven aliphatic dicarboxylic acids gave a "1" rating, whereas three other dicarboxylic acids and one mineral acid produced excessively colored (yellow) polymodal, resinous butadiene-styrene copolymers.

Attempted termination with acetic acid and other monocarboxylic acids resulted in hazy copolymers.

Polymers produced in accordance with the process of this invention have general applicability as is known for elastomeric and resinous polymers. These uses include such as shoe soles, various wire coating, containers, and the like. Most particularly, the resinous polymers are most desirably used for clear impact resistant resin applications, and most importantly my haze-free clear impact resistant resinous copolymers produced in accordance with my invention find greatest application.

Most preferred are the polymers prepared in accordance with this invention which are polymodal, resinous, linear or radical branched block copolymers which contain about 70 to 95 weight percent copolymerized monovinylarene based on the weight of total monomers employed, the balance being conjugated diene. The polymers of this invention when formed into articles exhibit outstanding properties including high impact strength and high environmental stress crack resistance, are transparent, colorless, yellow-free, and haze-free.

The disclosure, including data, illustrate the value and effectiveness of my invention. The Examples, the knowledge and background of the field of the invention, as well as the general principles of chemistry and other applicable sciences, have formed the bases to which the broad description of the invention including the range of conditions and generic groups of operate components have been developed, and further formed bases for my claims here appended.

I claim:

1. A process for the preparation of a resinous copolymer of at least one hydrocarbon conjugated diene and at least one hydrocarbon monovinylarene, which comprises copolymerizing at least one hydrocarbon conjugated diene and at least one monovinylarene employing hydrocarbon solvent, alkali metal initiator, and solution polymerization conditions, thereby producing an alkali metal-terminated copolymer, coupling with a multifunctional coupling agent to produce a coupled polymer in said solvent, wherein the improvement comprises treating the coupled copolymer in said solvent with an effective amount of at least one linear alkane dicarboxylic acid selected from the group consisting of $C_2$, $C_3$, and $C_5$ to $C_{16}$ saturated aliphatic diacids, thereby producing said resinous copolymer.

2. The process according to claim 1 wherein said saturated aliphatic diacid is selected from the group consisting of oxalic acid, malonic acid, glutaric acid, adipic acid, suberic acid, sebacic acid, undecanedioic acid, dodecanedioic acid, and mixtures.

3. The process according to claim 2 wherein said hydrocarbon conjugated diene is selected from 1,3-butadiene, isoprene, 2,3-dimethyl-1,3-butadiene, propylene, 3-butyl-1,3-octadiene, and 2-phenyl-1,3-butadiene; and wherein said hydrocarbon monovinyl arene is selected from the group consisting of styrene, alpha-methyl styrene, 1-vinylnaphthalene, 2-vinylnaphthalene, 3-methylstyrene, 4-n-propylstyrene, 4-cyclohexylstyrene, 4-dodecylstyrene, 3-ethyl-4-benzylstyrene, 4-p-tolystyrene, and 4-(4-phenyl-n-butyl)styrene.

4. The process according to claim 1 wherein said effective amount of said dicarboxylic acid is about 0.02 to 2 parts of dicarboxylic acid per 100 parts of copolymer.

5. The process according to claim 4 wherein said effective amount is the range of 0.1 to 0.4 parts dicarboxylic acid per 100 parts copolymer.

6. The process according to claim 5 wherein said copolymer is a butadiene/styrene copolymer.

7. The process according to claim 6 wherein said dicarboxylic acid is adipic acid.

8. The process according to claim 7 wherein said copolymer is a 76/24 styrene:butadiene block copolymer coupled with epoxidized soybean oil.

9. The process according to claim 1 wherein said coupled copolymer is treated in a concentrating step by flashing off a portion of the solution polymerization solvent prior to treating with said diacid.

10. The process according to claim 1 employing said diacid as an aqueous solution.

11. The process according to claim 1 employing said diacid as an admixture with a hydrocarbon solvent.

12. The process according to claim 7 employing said diacid as an aqueous solution.

13. The process according to claim 7 employing said diacid as an admixture with a hydrocarbon solvent.

14. The process according to claim 8 employing said diacid as an aqueous solution.

15. The process according to claim 8 employing said diacid as an admixture with a hydrocarbon solvent.

16. The process according to claim 1 wherein the resulting resinous copolymer is color- and haze-free.

* * * * *